(12) United States Patent
Fernandes

(10) Patent No.: US 11,007,938 B1
(45) Date of Patent: May 18, 2021

(54) VEHICULAR SAFETY VIDEO SYSTEM

(71) Applicant: Angelo Fernandes, Somerville, MA (US)

(72) Inventor: Angelo Fernandes, Somerville, MA (US)

( * ) Notice: Subject to any disclaimer, the term of this patent is extended or adjusted under 35 U.S.C. 154(b) by 9 days.

(21) Appl. No.: 16/444,050

(22) Filed: Jun. 18, 2019

(51) Int. Cl.
| | |
|---|---|
| *B60R 1/00* | (2006.01) |
| *B60R 11/02* | (2006.01) |
| *B60Q 1/44* | (2006.01) |
| *H04N 7/18* | (2006.01) |
| *H04N 9/87* | (2006.01) |
| *B60R 11/00* | (2006.01) |

(52) U.S. Cl.
CPC ............... *B60R 1/001* (2013.01); *B60Q 1/44* (2013.01); *B60R 11/0235* (2013.01); *H04N 7/183* (2013.01); *H04N 9/87* (2013.01); *B60R 2011/0026* (2013.01); *B60R 2011/0043* (2013.01); *B60R 2300/20* (2013.01); *B60R 2300/8033* (2013.01)

(58) Field of Classification Search
CPC . B60R 1/001; B60R 11/0235; B60R 2300/20; B60R 2011/0026; B60R 2300/8033; B60R 2011/0043; B60Q 1/44; H04N 9/87; H04N 7/183
See application file for complete search history.

(56) References Cited

U.S. PATENT DOCUMENTS

| | | | |
|---|---|---|---|
| 9,302,619 B2 | 4/2016 | Schumann | |
| 9,604,638 B2 * | 3/2017 | Kiyokawa | .......... B62D 15/0285 |
| 10,726,276 B2 * | 7/2020 | Han | .......... G08G 1/04 |
| 2007/0030212 A1 * | 2/2007 | Shibata | .......... G08G 1/162 |
| | | | 345/9 |
| 2007/0115138 A1 | 5/2007 | Arakawa | |
| 2008/0068455 A1 | 3/2008 | Pratt | |
| 2008/0136895 A1 | 6/2008 | Mareachen | |
| 2010/0097469 A1 * | 4/2010 | Blank | .......... B60R 1/12 |
| | | | 348/148 |
| 2012/0146953 A1 * | 6/2012 | Yi | .......... G06F 3/0412 |
| | | | 345/175 |
| 2012/0313793 A1 | 12/2012 | Huguenot | |
| 2014/0139333 A1 * | 5/2014 | Burgdorf | .......... B60T 7/042 |
| | | | 340/479 |

(Continued)

FOREIGN PATENT DOCUMENTS

JP 2009251933 A * 10/2009

*Primary Examiner* — Richard A Hansell, Jr.

(57) ABSTRACT

The vehicle safety video system is an electrical device. The vehicle safety video system is configured for use with a vehicle. The vehicle comprises an anterior side, a posterior side, and anterior windshield, a posterior windshield, and a VECU. The VECU further comprises a VECU brake signal. The vehicle safety video system captures one or more captured images from an anterior field of view of the vehicle. The vehicle safety video system displays the one or more captured images through the posterior windshield. The vehicle safety video system displays the one or more captured images such that the posterior windshield remains semitransparent during the display of the one or more captured images. The vehicle safety video system comprises a video circuit and the vehicle. The vehicle contains the video circuit. The video circuit captures and displays the one or more captured images.

5 Claims, 4 Drawing Sheets

(56) References Cited

U.S. PATENT DOCUMENTS

| | | | |
|---|---|---|---|
| 2014/0247160 A1* | 9/2014 | Glascock | G08G 1/095 340/907 |
| 2015/0282346 A1* | 10/2015 | Ganim | G06Q 30/0265 361/807 |
| 2018/0061323 A1* | 3/2018 | Kwon | G09G 3/3258 |
| 2018/0304810 A1 | 10/2018 | Brubaker | |
| 2020/0309361 A1* | 10/2020 | Mourou | B60R 11/0235 |

* cited by examiner

VEHICULAR SAFETY VIDEO SYSTEM

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including optical viewing arrangements, more specifically, an optical viewing arrangement integrated into a window of a vehicle.

SUMMARY OF INVENTION

The vehicle safety video system is an electrical device. The vehicle safety video system is configured for use with a vehicle. The vehicle comprises an anterior side, a posterior side, and anterior windshield, a posterior windshield, and a VECU. The VECU further comprises a VECU brake signal. The vehicle safety video system captures one or more captured images from an anterior field of view of the vehicle. The vehicle safety video system displays the one or more captured images through the posterior windshield. The vehicle safety video system displays the one or more captured images such that the posterior windshield remains semitransparent during the display of the one or more captured images. The vehicle safety video system comprises a video circuit and the vehicle. The vehicle contains the video circuit. The video circuit captures and displays the one or more captured images.

These together with additional objects, features and advantages of the vehicle safety video system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle safety video system in detail, it is to be understood that the vehicle safety video system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle safety video system.

It is therefore important that the claims be regarded as including such equivalent construction insofar as they do not depart from the spirit and scope of the vehicle safety video system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
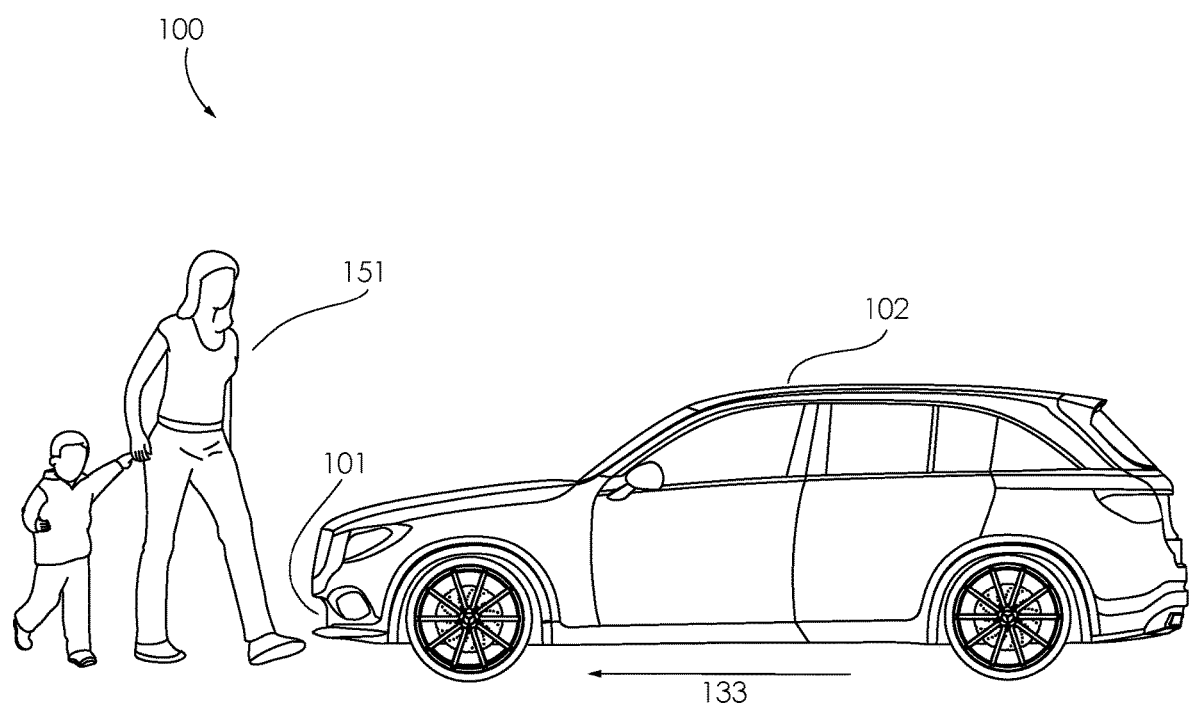
FIG. 1 is a perspective view of an embodiment of the disclosure.
Figure 2:
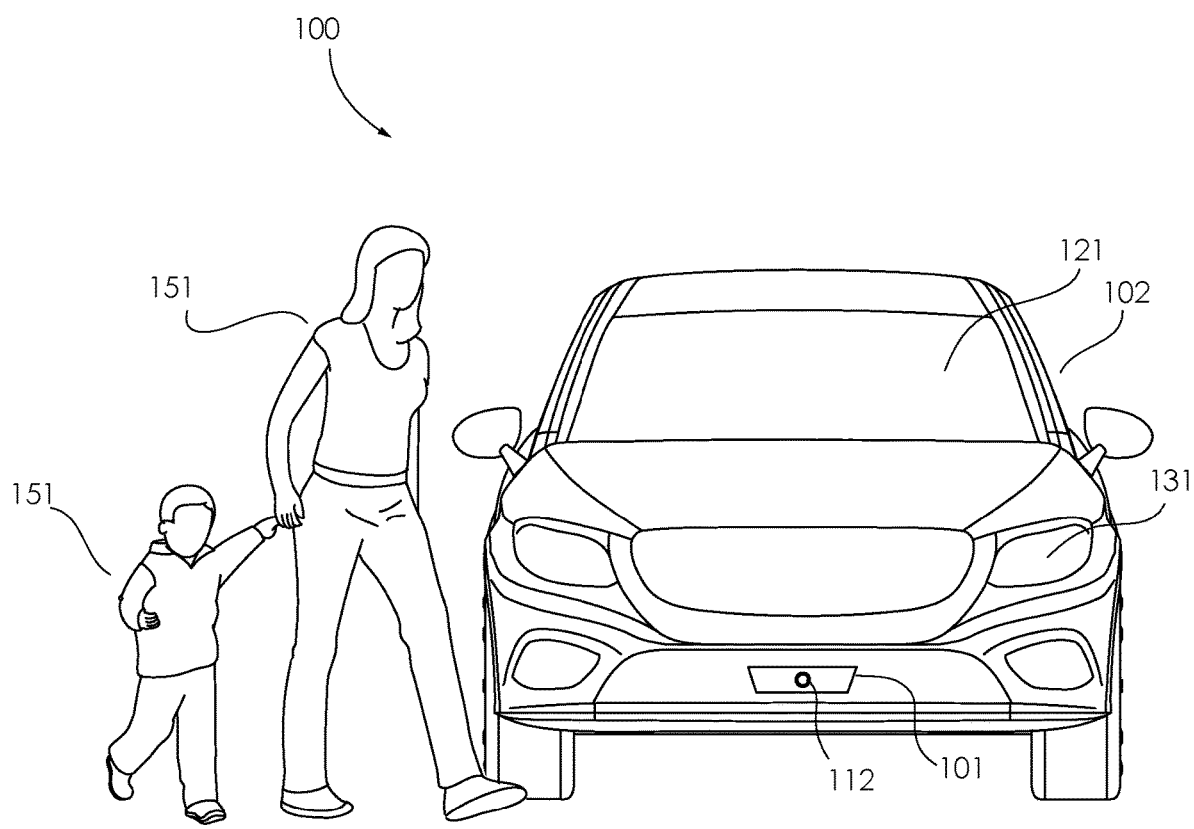
FIG. 2 is a front view of an embodiment of the disclosure.
Figure 3:
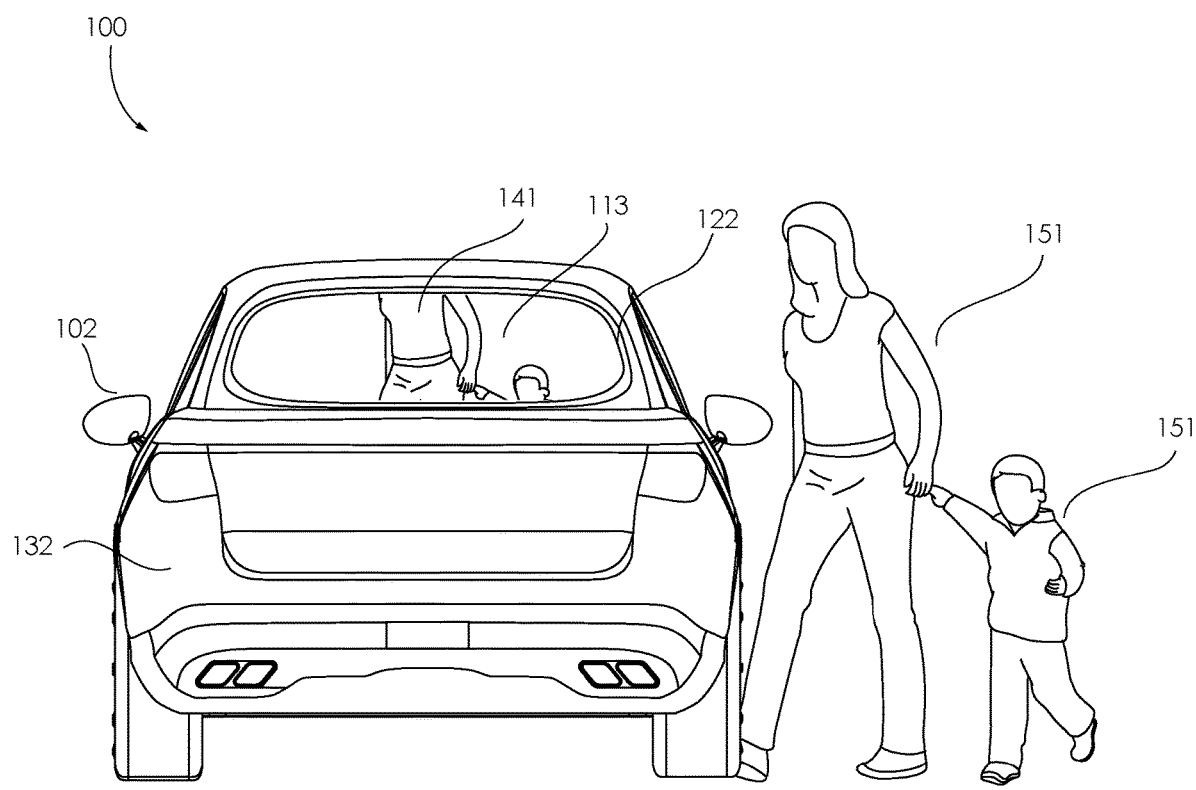
FIG. 3 is a rear view of an embodiment of the disclosure.
Figure 4:
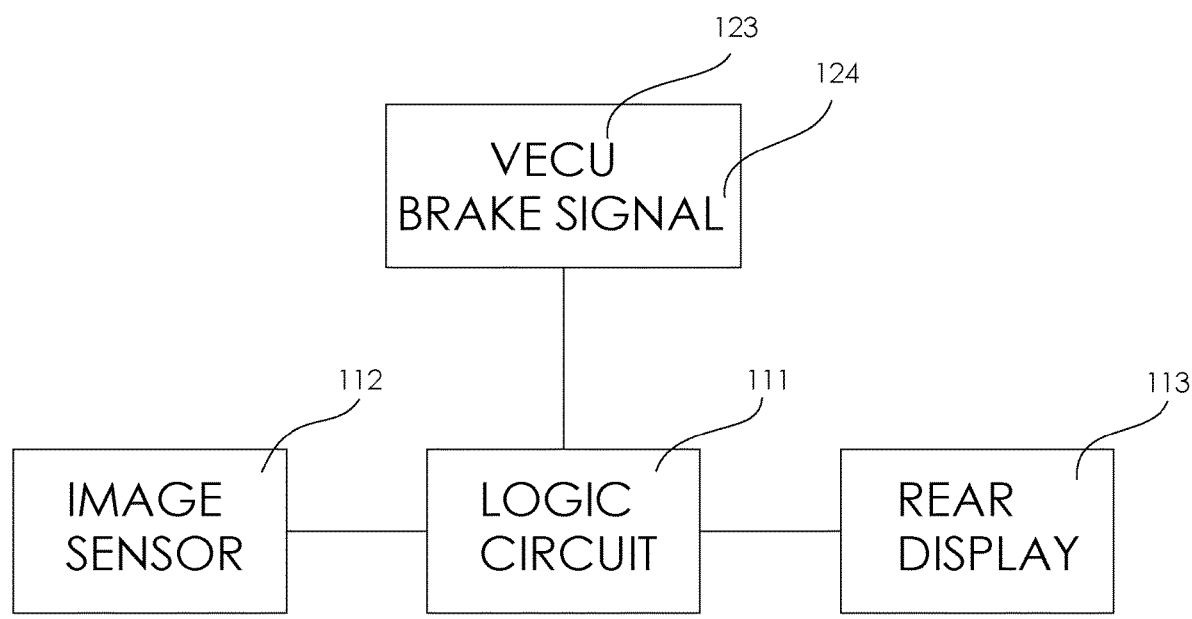
FIG. 4 is a block diagram or schematic view of an embodiment of the disclosure.

Detailed reference will now be made to one or more potential embodiments of the disclosure, which are illustrated in FIGS. 1 through 4.

The vehicle safety video system 100 (hereinafter invention) is an electrical device. The invention 100 is configured for use with a vehicle 102. The vehicle 102 comprises an anterior 131 side, a posterior 132 side, and anterior 131 windshield 121, a posterior 132 windshield 122, and a VECU 123. The VECU 123 further comprises a VECU 123 brake signal 124.

The intent of the invention 100 is to display a pedestrian 151 that is in the path of the primary sense of direction 133 of the vehicle 102 such that one or more vehicles traveling behind the vehicle 102 receive advance notice that the pedestrian 151 is in the path of the primary sense of direction 133 of the vehicle 102. The pedestrian 151 is defined in greater detail elsewhere in this disclosure. The invention 100 captures one or more captured images 141 from an anterior 131 field of view of the vehicle 102. The invention 100 displays the one or more captured images 141 through the posterior 132 windshield 122. The invention 100 displays the one or more captured images 141 such that the posterior 132 windshield 122 remains semitransparent during the display of the one or more captured images 141.

The invention 100 comprises a video circuit 101 and the vehicle 102. The vehicle 102 contains the video circuit 101. The video circuit 101 captures and displays the one or more captured images 141. Each of the one or more captured images is an electrically encoded representation of the light that is captured from the field of view of each of the one or more image sensors 112. Each of the one or more captured images 141 is subsequently converted back into an image that reproduces the originally captured image.

The vehicle 102 is defined in greater detail elsewhere in this disclosure. The vehicle 102 comprises an anterior 131 windshield 121, a posterior 132 windshield 122, and a VECU 123. The VECU 123 further comprises a VECU 123 brake signal 124. The vehicle 102 is further defined with an anterior 131 side, a posterior 132 side, and a primary sense of direction 133.

The anterior 131 is defined in greater detail elsewhere in this disclosure. The posterior 132 is defined in greater detail elsewhere in this disclosure. The primary sense of direction 133 is defined in greater detail elsewhere in this disclosure.

The anterior 131 windshield 121 is a windshield of the vehicle 102. The anterior 131 windshield 121 is commonly referred to as a front windshield. The posterior 132 windshield is a windshield of the vehicle 102. The posterior 132 windshield 122 is commonly referred to as a rear windshield.

The VECU 123 refers to the vehicle 102 engine control unit. The VECU 123 is provisioned as part of the vehicle 102 electrical system. The VECU 123 brake signal 124 is a switched electrical voltage which is actuated when the brake system of the vehicle 102 is actuated.

The video circuit 101 is an electrical circuit. The video circuit 101 captures one or more captured images 141 from a field of view that is on the anterior 131 side of the vehicle 102. The video circuit 101 captures the one or more captured images 141 from a field of view that is within the path of the primary sense of direction 133 of the vehicle 102. The video circuit 101 displays the one or more captured images 141 through the posterior 132 windshield 122 such that the one or more captured images 141 are visible when the vehicle 102 is viewed from the posterior 132 side of the vehicle 102. The video circuit 101 comprises a logic circuit 111, one or more image sensors 112, and a rear display 113. The logic circuit 111, the one or more image sensors 112, and the rear display 113 are electrically interconnected.

The logic circuit 111 is an electrical circuit. The logic circuit 111 controls the operation of the video circuit 101. The logic circuit 111 receives the one or more captured images from the one or more image sensors 112. The logic circuit 111 transmits the one or more captured images 141 to the rear display 113 for display.

In the first potential embodiment of the disclosure, the logic circuit 111 receives the VECU 123 brake signal 124 from the VECU 123 of the vehicle 102. The VECU 123 brake signal 124 electrically connects with the logic circuit 111. The logic circuit 111 monitors the VECU 123 brake signal 124 such that when the VECU 123 brake signal 124 signals the logic circuit 111 to initiate the operation of the video circuit 101.

Each of the one or more image sensors 112 is an electrical device. Each of the one or more image sensors 112 is configured to collect the one or more captured images 141 from a field of view targeted towards the path of the primary sense of direction 133 of the vehicle 102. The one or more image sensors 112 transmits the one or more captured images 141 to the logic circuit 111.

The one or more image sensors 112 is configured for use with a logic circuit 111. The logic circuit 111 further operates the rear display 113. The one or more image sensors 112 receives light from the field of view of the one or more image sensors 112 and converts the received light into a digital representation of sufficient detail to allow the logic circuit 111 to create and display a visual reproduction of the source of the captured light on the rear display 113.

The rear display 113 is an electrical device. The rear display 113 receives the one or more captured images 141 as an electrical signal transmitted by the logic circuit 111. The rear display 113 mounts in the posterior 132 windshield 122. The rear display 113 visibly displays the received one or more captured images 141 through the posterior 132 windshield 122 such that the one or more captured images 141 are visible to trailing vehicles. By trailing vehicle is meant that the trailing vehicle is in a position that is posterior 132 to the vehicle 102.

The rear display 113 is a transparent display. By transparent display is meant that rear display 113 is a semitransparent structure that allows at least 25 percent of the light that strikes the anterior 131 surface of the rear display 113 to pass through the rear display 113 such that the light is visible from the posterior 132 side of the rear display 113. In the first potential embodiment of the disclosure, the rear display 113 is a transparent OLED display. The transparent OLED display is defined in greater detail elsewhere in this disclosure.

The transparent OLED display is a commercially available technology that is commonly marketed as OLED transparent TV and OLED transparent signage. Examples of OLED transparent TV technology and an example of OLED signage technology are documented in the IDS accompanying this disclosure. The transparent OLED display is formed from organic LED technology. In organic OLED technology is formed from a composite material formed from a plurality of sheetings made from organic polymers. The composite material is then sandwiched between two electrodes. The organic polymers are selected such that when a voltage is applied across the electrodes, the composite material emits light in response to the voltage in a manner similar to the light emission of an LED. The sheetings made from organic polymers are transparent structures. When the electrodes are formed from an organic polymer, the structure of the resulting OLED technology is also transparent, which allows for the creation of the OLED transparent TV and OLED transparent signage. An example of a transparent electrode is indium tin oxide.

The following definitions were used in this disclosure:

Anterior: As used in this disclosure, anterior is a term that is used to refer to the front side or direction of a structure. When comparing two objects, the anterior object is the object that is closer to the front of the structure.

Camera: As used in this disclosure, a camera is a sensor that converts light into electric signals that encode and records the spatial orientation of the captured light in a manner that reproduces the images seen by a human eye.

Composite: As used in this disclosure, composite refers to a two-dimensional or three-dimensional structure that that is formed from two or more distinctly identifiable sub-structures.

Composite Material: As used in this disclosure, a composite material is a multilayer structure made of two or more joined layers of sheeting materials and coatings.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner.

Field of View: As used in this disclosure, a field of view refers to one or more angles which delimits an area from which electromagnetic radiation will be sensed by a person or an image sensor.

Flexible: As used in this disclosure, flexible refers to an object or material that will deform when a force is applied to it but that will not necessarily return to its original shape when the deforming force is removed.

Image: As used in this disclosure, an image is an optical representation or reproduction of an indicia or of the appearance of something or someone.

LED: As used in this disclosure, an LED is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

Light: As used in this disclosure, light refers to electromagnetic radiation that illuminates an area. Illumination is a synonym for light, particularly in cases where a measure of the amount of light in a space is called for.

Logic Circuit: As used in this disclosure, a logic circuit is a non-programmable electrical device that receives one or more digital or analog inputs and uses those digital or analog inputs to generate one or more digital or analog outputs.

OLED Display: As used in this disclosure, the OLED display is an electrical device. OLED is an acronym for an organic light emitting diode. The OLED display is a composite material formed from a plurality of films made from organic materials. These organic films form a plurality of LED-like structures that illuminate an image that is displayed on the OLED display. A first advantage of the OLED display is that the layered film structure of the OLED display allows for the OLED display to be designed as a flexible structure. The second advantage of an OLED display is that the layered film structure of the OLED display is a thin structure allows the OLED display to be designed as a semitransparent structure that allows a viewer to see what is behind the display. The OLED display is a commercially available device.

Organic: As used in this disclosure, organic refers to a carbon-based chemical structure. A limited number of (mostly) carbon-based salts are traditionally considered inorganic chemical structures and are excluded from the study of organic chemistry.

Overlay: As used in this disclosure, an overlay refers to the placement of a second structure over a first structure such that a portion of the first structure is visible through the second structure.

Pedestrian: As used in this disclosure, a pedestrian is an individual walking on, along, or near a road network.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Semitransparent: As used in this disclosure, semitransparent refers to a partially transparent object.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Transparent: As used in this disclosure, transparent refers to a material that allows light to pass through the material without significant scattering such that an object can be clearly seen through the material.

Windshield: As used in this disclosure, a windshield refers to the front and rear window of a vehicle that is intended to shield the occupants of the vehicle from the wind generated by the normal motion of the vehicle. Windscreen is a synonym for windshield.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. The vehicle safety video system comprising
a video circuit and a vehicle;
wherein the vehicle safety video system is an electrical device;
wherein the vehicle safety video system is configured for use with the vehicle;
wherein the vehicle contains the video circuit;
wherein the video circuit captures and displays one or more captured images;
wherein the video circuit comprises a logic circuit, one or more image sensors, and a rear display;
wherein each of the one or more captured images is an electrically encoded representation of the light that is captured from the field of view of each of the one or more image sensors;
wherein each of the one or more captured images is subsequently converted back into an image that reproduces the originally captured image;
wherein the vehicle comprises an anterior side, a posterior side, and anterior windshield, a posterior windshield, a vehicle engine control unit (hereinafter VECU), and a primary sense of direction;
wherein the anterior side, the posterior side, the anterior windshield, the posterior windshield, and the VECU are contained in the vehicle;
wherein the primary sense of direction is a vector along the anterior-posterior axis with a direction from the posterior to the anterior;
wherein the anterior windshield is a front windshield;
wherein the posterior windshield is a rear windshield;
wherein the logic circuit, the one or more image sensors, and the rear display are electrically interconnected;

wherein the logic circuit receives a VECU brake signal from the VECU of the vehicle;

wherein the logic circuit monitors the VECU brake signal;

wherein the VECU brake signal signals the logic circuit, and the logic circuit in turn initiates the operation of the video circuit;

wherein the VECU brake signal is a switched electrical voltage which is actuated when a brake system of the vehicle is actuated;

wherein the video circuit is an electrical circuit;

wherein the video circuit captures one or more captured images from a field of view that is on the anterior side of the vehicle;

wherein the video circuit captures the one or more captured images from a field of view that is within the path of the primary sense of direction of the vehicle;

wherein the video circuit displays the one or more captured images through the posterior windshield such that the one or more captured images are visible when the vehicle is viewed from the posterior side of the vehicle;

wherein the rear display is a transparent display;

wherein the transparent display is a semitransparent structure that allows at least 25 percent of the light that strikes the anterior surface of the rear display to pass through the rear display such that the light is visible from the posterior side of the rear display;

wherein the vehicle safety video system captures one or more captured images from an anterior field of view of the vehicle;

wherein the vehicle safety video system displays the one or more captured images through the posterior windshield;

wherein the vehicle safety video system displays the one or more captured images such that the posterior windshield remains semitransparent during the display of the one or more captured images.

2. The vehicle safety video system according to claim 1 wherein the rear display is a transparent OLED display.

3. The vehicle safety video system according to claim 2
wherein each of the one or more image sensors is an electrical device;

wherein each of the one or more image sensors is configured to collect the one or more captured images from a field of view targeted towards the path of the primary sense of direction of the vehicle.

4. The vehicle safety video system according to claim 3 wherein the rear display mounts in the posterior windshield.

5. The vehicle safety video system according to claim 4
wherein the rear display visibly displays the received one or more captured images through the posterior windshield such that the one or more captured images are visible to trailing vehicles;

wherein by trailing vehicle is meant that the trailing vehicle is in a position that is posterior to the vehicle.

* * * * *